US008380865B2

(12) United States Patent
Svennebring et al.

(10) Patent No.: US 8,380,865 B2
(45) Date of Patent: Feb. 19, 2013

(54) GAMING SYSTEM AND A METHOD OF MANAGING BANDWIDTH USAGE IN A GAMING NETWORK

(75) Inventors: Tobias Svennebring, Nacka (SE); Christer Hutchinson-Kay, Taby (SE)

(73) Assignee: ACEI AB (SE)

( * ) Notice: Subject to any disclaimer, the term of this patent is extended or adjusted under 35 U.S.C. 154(b) by 774 days.

(21) Appl. No.: 12/265,372

(22) Filed: Nov. 5, 2008

(65) Prior Publication Data

US 2009/0197683 A1 Aug. 6, 2009

(30) Foreign Application Priority Data

Nov. 5, 2007 (AU) ................................ 2007906056

(51) Int. Cl.
*G06F 15/16* (2006.01)
*G06F 15/173* (2006.01)

(52) U.S. Cl. ........................................ 709/231; 709/226

(58) Field of Classification Search .................. 709/231, 709/226; 463/1, 25, 42
See application file for complete search history.

(56) References Cited

U.S. PATENT DOCUMENTS 5,463,616 A 10/1995 Kruse et al.
6,026,079 A 2/2000 Perlman
6,075,770 A 6/2000 Chang et al.
6,714,545 B1 3/2004 Hugenberg et al.
7,922,585 B2 * 4/2011 Vlazny et al. .................. 463/42
2002/0059574 A1 * 5/2002 Tudor et al. ....................... 725/1
2003/0037156 A1 2/2003 Mallart
2004/0015608 A1 * 1/2004 Ellis et al. ..................... 709/246
2004/0266533 A1 * 12/2004 Gentles et al. .................. 463/42
2005/0039205 A1 * 2/2005 Riedl .............................. 725/32
2005/0192099 A1 * 9/2005 Nguyen et al. .................. 463/42
2006/0040732 A1 * 2/2006 Baerlocher et al. ............. 463/25
2006/0143675 A1 * 6/2006 Willis et al. ................... 725/114
2007/0061201 A1 * 3/2007 Ellis et al. ....................... 705/14
2007/0061202 A1 * 3/2007 Ellis et al. ....................... 705/14
2007/0061203 A1 * 3/2007 Ellis et al. ....................... 705/14
2007/0061204 A1 * 3/2007 Ellis et al. ....................... 705/14
2007/0202954 A1 * 8/2007 Morrow et al. ................. 463/42
2009/0024480 A1 * 1/2009 Dai ................................ 705/14
2009/0222315 A1 * 9/2009 Hayes, Jr. ....................... 705/10
2010/0227680 A1 * 9/2010 Leopold et al. ................. 463/29
2011/0294575 A1 * 12/2011 Morrow et al. ................. 463/30

FOREIGN PATENT DOCUMENTS

EP 0988878 3/2000
JP 2006311605 11/2006
KR 20040004724 1/2004
KR 20050000787 1/2005
WO 0010663 3/2000
WO 03015355 2/2003
WO 2007053210 5/2007

* cited by examiner

*Primary Examiner* — Jerry Dennison
(74) *Attorney, Agent, or Firm* — McAndrews, Held & Malloy, Ltd.

(57) ABSTRACT

A plurality of games are implemented at a plurality of gaming machines. At least one server (30, 36, 38) serves game play and non-game play related data to at least one gaming machine (12, 12'), and a resource control unit (50, 202) obtains information indicative of bandwidth usage of a plurality of gaming machines (12, 12'), and controls the level of non-game play related data served to at least one gaming machine based on the information.

30 Claims, 7 Drawing Sheets

230

232

| Available bandwidth ------------------- Number of IVTs at venue | 64 kbit/sec | 128 kbit/sec | 256 kbit/sec |
|---|---|---|---|
| 25 | N/A | 1;0 | 12;0 , 8;50% , 4;75%; |
| 20 | N/A | 1;0 | 12;0 , 8;50% , 4;75%; |
| 15 | 1;0 | 3;0 | 12;0 , 8;50% , 4;75%; |
| 10 | 1;0 | 3;0 | 8;0 , 4;50% , 2;75% |
| 5 | 2;0 | 4;0 | 5;0 |

234 236 238 236 238

GAMING SYSTEM AND A METHOD OF MANAGING BANDWIDTH USAGE IN A GAMING NETWORK

RELATED APPLICATIONS

This application claims priority to Australian Provisional Patent Application No. 2007906056 having a filing date of Nov. 5, 2007, which is hereby incorporated by reference herein in its entirety.

FIELD OF THE INVENTION

The present invention relates to a gaming system and to a method of managing bandwidth usage in a gaming system.

BACKGROUND OF THE INVENTION

It is known to provide a gaming system which comprises a plurality of player operable gaming machines connected together in a network and a remote gaming base station which communicates with the gaming machine network for example through the Internet. The remote gaming base station may cooperate with each of the gaming machines so that a game is partly implemented by the gaming machine and partly implemented by the remote gaming base station, or so that a game is predominantly implemented by the remote gaming base station and the gaming machine acts only as a terminal providing a player interface. This type of server-based gaming arrangement provides a flexible platform which simplifies gaming management by centralizing gaming management functions at the gaming base station. In particular, the arrangement allows games which are implementable using the gaming base station and the gaming machines to be updated centrally at the gaming base station, and expensive gaming machines dedicated to one or more particular games are avoided.

However, with such client-server type gaming arrangements, a problem can occur because several networked gaming machines typically share a common communications link with the remote base station which can cause gaming machines to compete with each other for bandwidth. This is of particular concern when a gaming machine performing a file download for the purpose of updating gaming machine software prevents another gaming machine from implementing a game.

Data communications in a client-server type gaming system are usually based on TCP/IP technology. In TCP/IP, basic functionality is available to handle congestion situations which may occur during data transfer from a data source by sending an Internet Control Message Protocol (ICMP) from a network card of a receiving device to the data source to stop or delay data transfer.

However, for a client-server type gaming system this mechanism is perceived to be too static since some types of data are more sensitive to delay than others.

SUMMARY OF THE INVENTION

In accordance with a first aspect of the present invention, there is provided a gaming system arranged to implement a plurality of games at a plurality of gaming machines, the gaming system comprising:

at least one server arranged to serve game play and non-game play related data to at least one gaming machine; and a resource control unit arranged to obtain information indicative of bandwidth usage of a plurality of gaming machines, and to control the level of non-game play related data served to at least one gaming machine based on the information.

The at least one server may comprise a game play related server and a non-game play related server.

In one embodiment, the gaming system comprises a plurality of gaming machines. The gaming machines may be located in a plurality of gaming venues such that each gaming venue has a plurality of associated gaming machines.

The gaming system may comprise a communications network arranged to facilitate communications between the gaming machines and the game play and non-game play related servers. The communications network may be a wide area network such as the Internet.

In one embodiment, the gaming system is arranged to maintain a queue having a queue filling level indicative of a level of non-game play and/or game play related activity associated with each gaming venue, and the resource control unit is arranged to control the level of non-game play related data served to the at least one gaming machine based on the queue filling level.

In one embodiment, the gaming system is arranged to maintain a low priority queue having a low priority queue filling level indicative of a level of non-game play related activity associated with each gaming venue, and the resource control unit is arranged to control the level of non-game play related data served to the at least one gaming machine based on the low priority queue filling level.

The gaming system may further comprise a network access controller arranged to maintain the queue.

In one arrangement, the resource control unit is arranged to decrease the level of non-game play related data served to the at least one gaming machine if the queue exceeds a high activity threshold. The high activity threshold may be 80% of a full low priority queue.

In one embodiment, the level of non-game play related data served to the at least one gaming machine is decreased only if the queue level exceeds a high activity threshold for a predetermined period of time.

In one arrangement, the resource control unit is arranged to increase the level of non-game play related data served to the at least one gaming machine if the queue filling level is less than a low activity threshold. The low activity threshold may be 40% of a full low priority queue.

In one embodiment, the level of non-game play related data served to the at least one gaming machine is increased only if the queue filling level is less than a low activity threshold for a predetermined period of time.

In addition or alternatively, the gaming system is arranged to maintain a high priority queue having a high priority queue filling level indicative of a level of game play related activity associated with each gaming venue, and the resource control unit is arranged to control the level of non-game play related data served to the at least one gaming machine based on the high priority queue filling level.

In an alternative embodiment, the resource control unit is arranged to obtain data indicative of the available bandwidth between the communications network and each gaming venue and of the number of gaming machines associated with the gaming venue logged into the gaming system, and to control the level of non-game play related data served to the at least one gaming machine based on the obtained data.

The gaming system may comprise a lookup table arranged to store values for allowed levels of non-game play related data for available bandwidth and number of logged in gaming machines, and the resource control unit may be arranged to extract a value for an allowed level of non-game play related data from the lookup table and to modify the allowed level of non-game play related data for a venue based on the extracted value.

The gaming system may further comprise a back office database arranged to store data indicative of the available bandwidth between the communications network and each gaming venue and of the number of gaming machines associated with the gaming venue logged into the gaming system.

The gaming system may further be arranged to establish a virtual communication channel to each gaming machine and to establish a VPN tunnel for each communication channel.

The at least one non-game play related server may comprise an update server arranged to provide the gaming machines with updated software and a streaming data server arranged to provide the gaming machines with images and/or video which may be advertising information.

According to a second aspect of the present invention there is provided a method of managing bandwidth usage in a gaming system comprising a plurality of gaming machines and a communication network arranged to facilitate communications between a remote base station and the gaming machines, the method comprising:

- serving game play related data to at least one gaming machine during implementation of a game;
- serving non-game play related data to at least one gaming machine;
- obtaining information indicative of bandwidth usage of a plurality of gaming machines; and
- controlling the level of non-game play related data served to at least one gaming machine by the at least one non-game play related server based on the information.

BRIEF DESCRIPTION OF THE DRAWINGS

The present invention will now be described, by way of example only, with reference to the accompanying drawings, in which.

DESCRIPTION OF AN EMBODIMENT OF THE INVENTION

Figure 1:
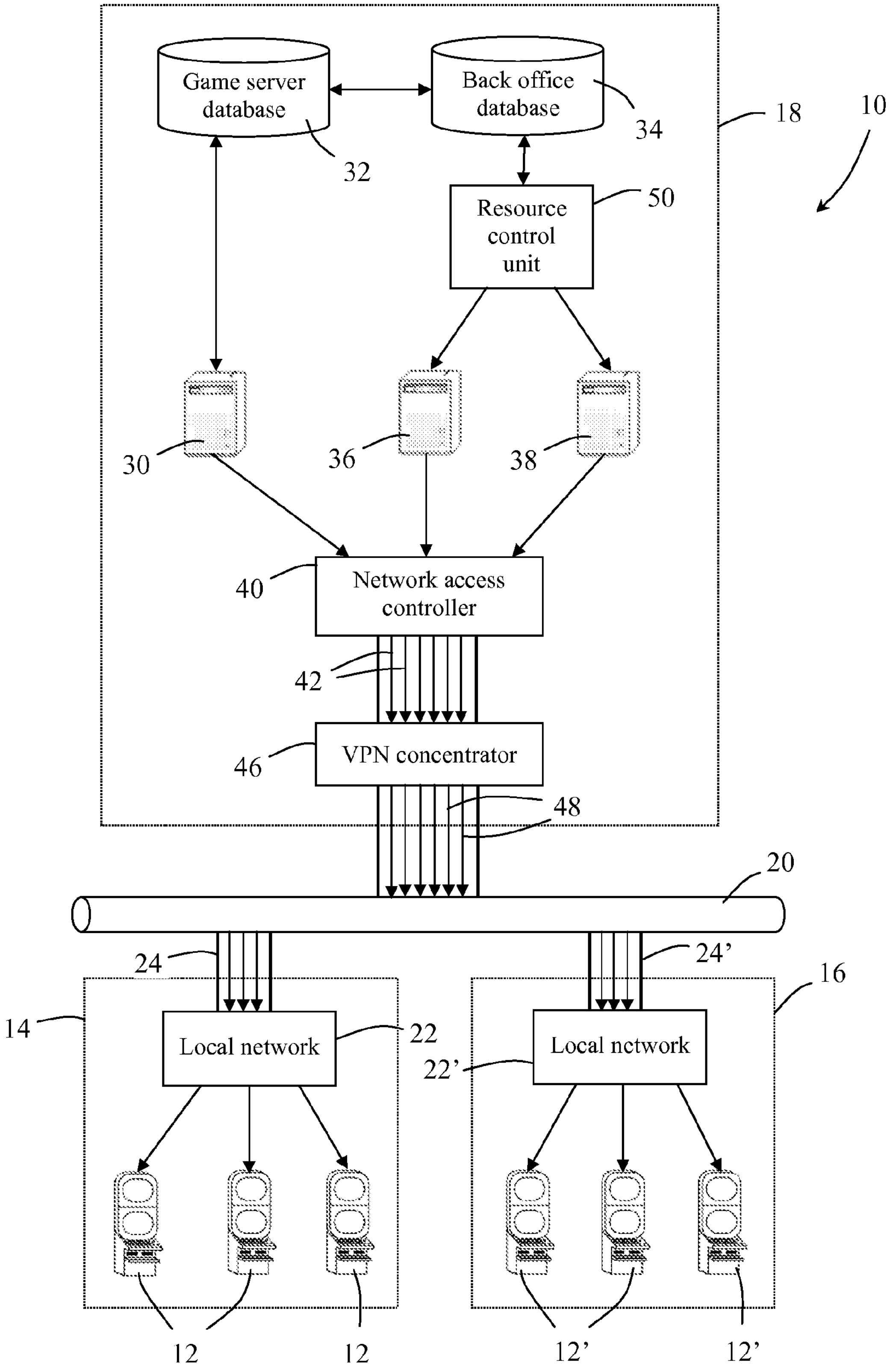
FIG. 1 is a schematic diagram of a gaming system in accordance with an embodiment of the present invention.
Figure 2:
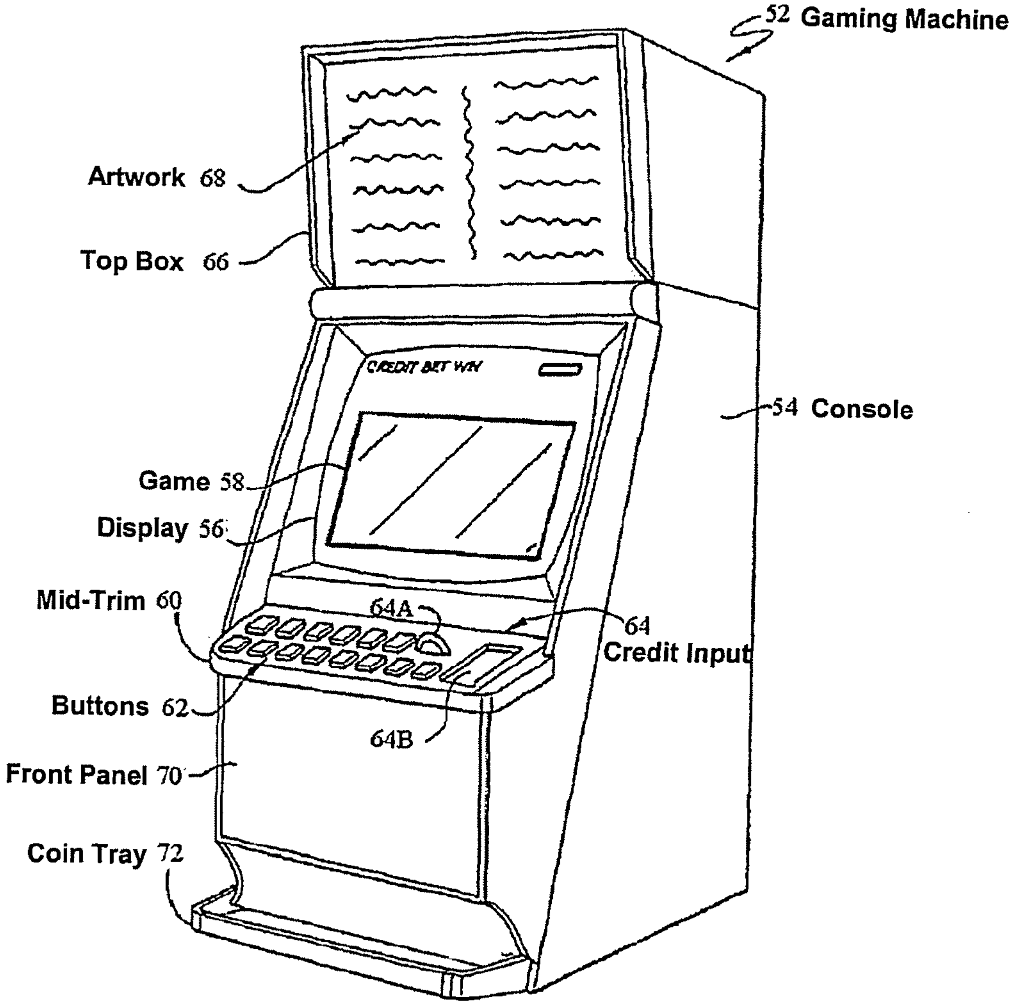
FIG. 2 is a diagrammatic representation of a gaming machine of the gaming system shown in FIG. 1.
Figure 3:
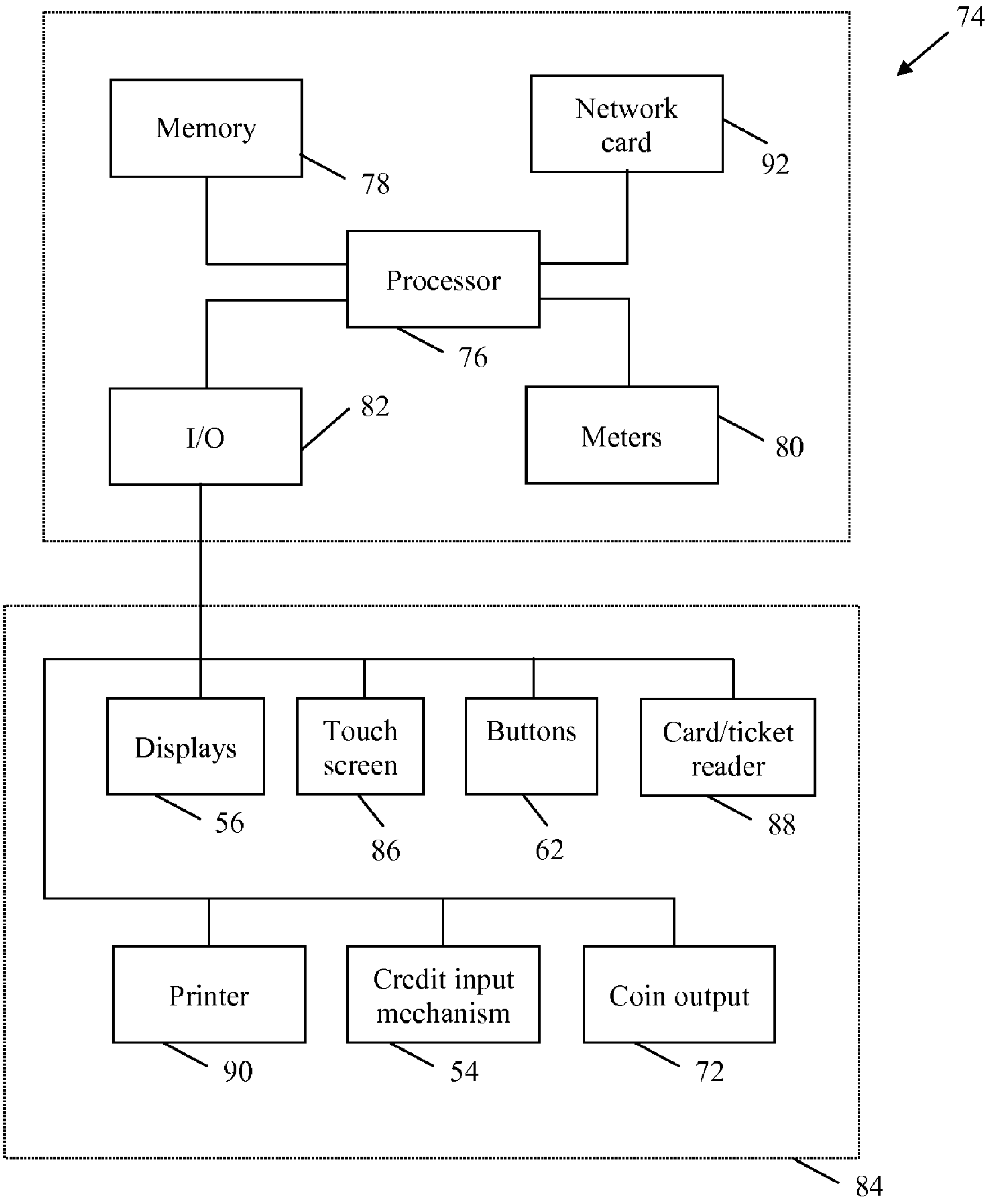
FIG. 3 is a schematic block diagram of operative components of the gaming machine shown in FIG. 2.

Referring to FIGS. 1 to 3 of the drawings, there is shown a gaming system 10 including multiple player operable gaming machines 12, 12', each of which in this example is arranged to implement a probabilistic wagering game of the type wherein a player wagers a bet amount, and a game outcome is determined in a probabilistic way. With some such probabilistic games, several symbols from a set of symbols are randomly displayed, and a game outcome is determined on the basis of the displayed symbols.

In this example, the gaming machines 12, 12' are located at two gaming venues, a first gaming venue 14 including first gaming machines 12 and a second respective gaming venue 16 including second gaming machines 12'. However, it will be understood that any number of gaming venues may be associated with the gaming system 10.

The gaming machines 12, 12' are connected together through a respective local network 22, 22' which facilitates communications with a remote base station 18 through a wide area network, in this example the Internet 20. During use, when a communication is established between a local network 22, 22' and the remote base station 18, all communications between a gaming venue 14, 16 and the remote base station 18 flow through a respective venue network connection 24, 24'.

The remote base station 18 includes a gaming server 30 and a game server database 32 for storing programs and data which may be served to the gaming machines 12, 12' by the gaming server 30 during use so that the gaming machines 12, 12' may implement a game. The game server database communicates with a back office database 34 which is arranged to store information indicative of gaming machines 12, 12' which are associated with a venue 14, 16, which gaming machines 12, 12' are logged in to the gaming system 10, and the available bandwidth between the remote base station 18 and the wide area network 20 and between the gaming venues and the wide area network 20.

The remote base station 18 also includes a software update server 36 and a streaming data server 38. The software update server 36 is used to provide the gaming machines 12, 12' with updated software. The streaming data server 38 is used to provide each of the gaming machines 12, 12' with additional information such as images, or moving pictures which may be displayed to players during or between games but which are not directly related to game play, for example advertising material.

The remote base station also includes a network access controller 40 which establishes a virtual communication channel 42 to each gaming machine 12, 12' according to an Ethernet protocol, each communication channel 42 being associated with one gaming machine 12, 12' and having a unique virtual IP address. The virtual communication channels 42 pass through a virtual private network (VPN) concentrator 46 which establishes a VPN tunnel 48 for each communication channel and encrypts all data flowing through the channels.

It will be understood that since the bandwidth available at each venue network connection 24, 24' is finite and all communications from and to the gaming machines 12, 12' pass through a venue network connection 24, 24', the communication speeds associated with the gaming machines 12, 12' are interdependent in that an increase in communication speed of one gaming machine has the potential to affect the communication speed available for one or more other gaming machines 12, 12' at the same venue.

The remote base station 18 also includes a resource control unit 50 which is arranged to gather information indicative of bandwidth usage in respect of each gaming venue 14, 16 and to modify the level of low priority functions which do not directly relate to game play depending on the gathered information. In this example, the low priority functions are carried out by the update server 36 and the streaming data server 38, and operation is such that low priority activity is maintained at a level such that high priority activity, that is game play activity, is not adversely affected by low priority functions.

It will also be understood that since the gaming system 10 shown in FIG. 1 is part of a distributed network architecture, some of the components required for implementing the game are present in each of the player operable gaming machines 12, 12' and some of the components required for implementing the game are remotely located and executed in this example by the gaming server 30 in association with the game server database 32. Various arrangements for implementing a game using this type of architecture are envisaged.

For example, a "thick client" arrangement may be used wherein part of the game is executed on a gaming machine 12, 12' and part of the game is executed by the gaming server 30, or a "thin client" arrangement may be used wherein most of the game is executed remotely by the gaming server 30 and a gaming machine 12, 12' is used only to display audible and/or visible gaming information to the player and receive gaming inputs from the player.

However, it will be understood that other arrangements are envisaged. For example, an architecture may be provided wherein the respective functions of the gaming machine 12, 12' and the gaming server 30 are selectively modifiable. For example, the gaming system may operate in stand alone gaming machine mode, "thick client" mode or "thin client" mode depending on the game being played, operating conditions, and so on. Other variations will be apparent to persons skilled in the art.

A gaming machine 12 is illustrated in more detail in FIG. 2. The gaming machine 12 includes a console 54 having a display 56 on which is displayed representations of a game 58 that can be played by a player. A mid-trim 60 of the gaming machine 12 houses a bank of buttons 62 for enabling a player to interact with the gaming machine during game play, including enabling the player to select the bet amount. The mid-trim 60 also houses a credit input mechanism 64 which in this example includes a coin input chute 64A and a bill collector 64B. A reading device may also be provided for the purpose of reading a player tracking device, for example as part of a loyalty program. The player tracking device may be in the form of a card, flash drive or any other portable storage medium capable of being read by the reading device.

A top box 66 may carry artwork 68, including for example pay tables and details of bonus awards and other information or images relating to the game. In this example, the top box 66 may comprise an advertising display arranged to display images and/or moving pictures served to the gaming machine 12 by the streaming data server 38. Further artwork and/or information may be provided on a front panel 70 of the console 54. A coin tray 72 is mounted beneath the front panel 70 for dispensing cash payouts from the gaming machine 12.

The display 56 is in the form of a video display unit, particularly a cathode ray tube screen device. Alternatively, the display 56 may be a liquid crystal display, plasma screen, any other suitable video display unit.

FIG. 3 shows a block diagram of operative components 74 of the gaming machine 12.

The operative components 74 include a processor 76 and a memory 78. Instructions and data to control operation of the processor 74 are stored in the memory 78. Typically, the gaming machine 12 will include both volatile and non-volatile memory and more than one of each type of memory, with such memories being collectively represented by the memory 78.

The gaming machine 12 also includes meters 80 for purposes including ensuring regulatory compliance and monitoring player credit, and an input/output (I/O) interface 82 for communicating with a player interface 84.

In the example shown in FIG. 3, the player interface 84 includes the display 56, buttons 62 and the credit input mechanism 54, and also comprises a touch screen 86, a card and/or ticket reader 88 and a printer 90. Additional hardware may be included as part of the gaming machine 12, or hardware may be omitted as required for the specific implementation.

In addition, the gaming machine 12 includes a communications interface, for example a network card 92, which facilitates communications between gaming machines 12 and with the remote base station 18 through the wide area network 20.

In this embodiment, the game server 30 implements most or all of the games played by a player using a gaming machine 12, and the gaming machine 12 essentially provides only the player interface. During use, the gaming machine 12 receives player instructions, and passes the instructions to the gaming server 30 which processes the instructions and returns game play outcomes to the gaming machine 12 for display.

It will be understood that additional servers (not shown) may be provided to assist in the administration of the gaming system 10, including for example a gaming floor management server and a licensing server to monitor the use of licenses relating to particular games. An administrator terminal may also be provided to allow an administrator to monitor the gaming system 10 and the gaming machines 12 incorporated into the gaming system 10.

Operation of an exemplary gaming system 10 will now be described with reference to the flow diagram 100 shown in FIG. 4. The flow diagram illustrates steps 102 to 114 carried out by the gaming system 10 in a method of managing bandwidth usage in accordance with an embodiment of the invention.

In the present example shown in FIG. 1, a first venue 14 is provided with three gaming machines 12 and a second venue 16 is provided with three gaming machines 12', each gaming machine 12, 12' communicating with the network access controller 40 through a VPN tunnel 48.

During implementation of a game, the gaming server 30 in association with the game server database 32 communicates with one or more gaming machines 12, 12' through respective one or more VPN tunnels 48 in order to implement a game. The communications between the gaming server 30 and the gaming machines 12, 12' are considered high priority communications since such communications are directly related to game play.

The gaming machines 12, 12' also receive communications from the software update server 36 and the streaming data server 38 in order to distribute new or updated software to the gaming machines 12, 12', and to provide the gaming machines 12, 12' with streaming data such as images or moving pictures, for example for advertising purposes. The communications from the software update server 36 and the streaming data server 38 are considered low priority communications because such communications are not directly related to game play.

During use, the network access controller 40 maintains a high priority queue and a low priority queue, the high priority queue providing an indication as to the level of high priority activity, that is game play related activity, for each venue, and the low priority queue providing an indication as to the level of low priority activity, that is non-game play related activity, for each venue. The indication provided by each queue as to low or high priority activity is referred to as the filling degree and is indicative of how full the queue is.

The filling degree of each of the low and high priority queues for each venue is determined by the network access controller 40 by monitoring the data received from the gaming server 30, the software update server 36 and the steaming data server 38.

Figure 4:
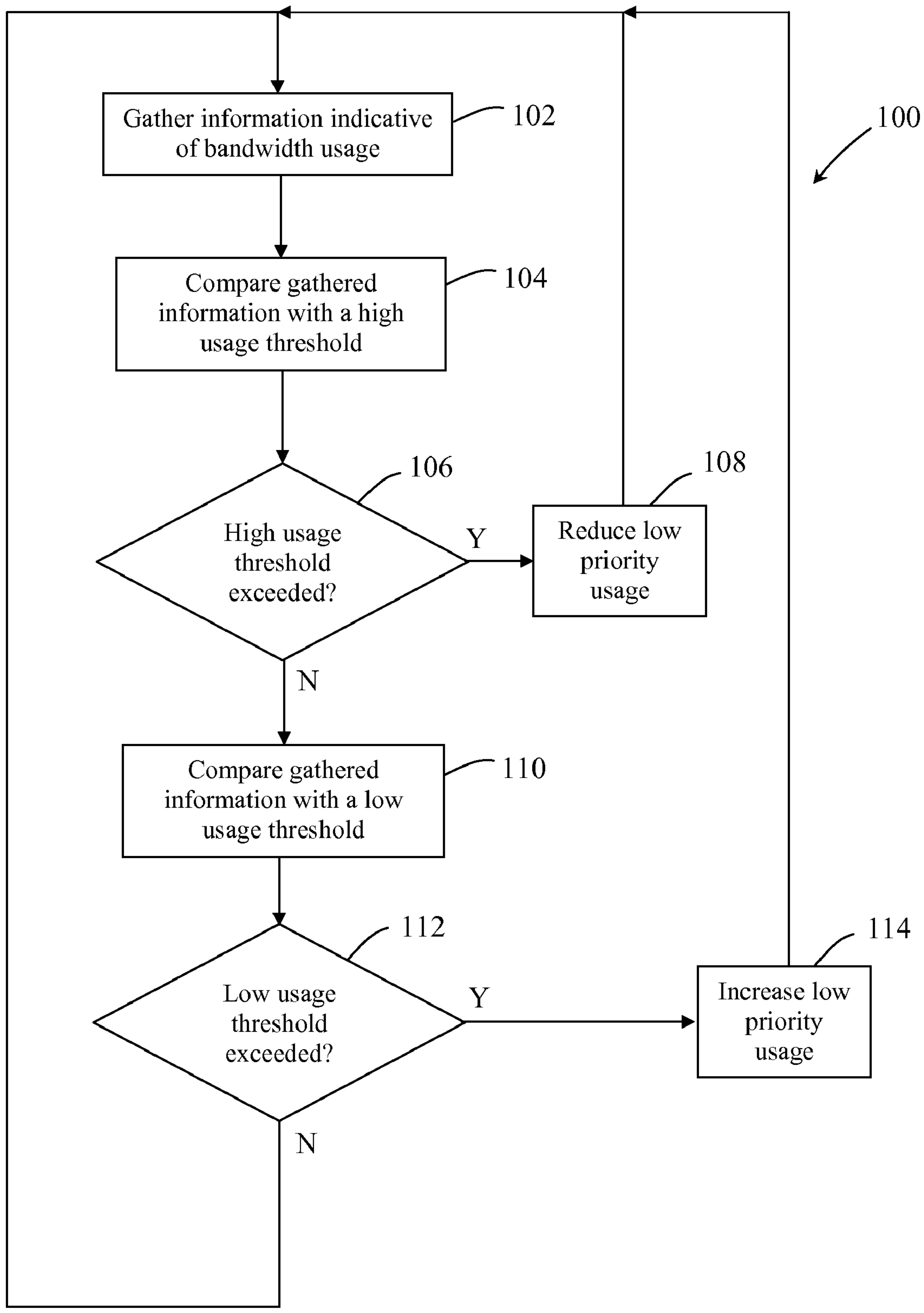
FIG. 4 is a flow diagram illustrating a method of managing bandwidth usage in the gaming system shown in FIG. 1.

As represented by the flow diagram 100 in FIG. 4, during use the resource control unit 50 gathers information indicative of bandwidth usage at each venue by generating filling degree values for the low priority queues associated with the venues and compares the filling degree values with maximum and minimum filling degree thresholds. If the filling degree value associated with a venue exceeds the maximum filling degree threshold, the resource control unit 50 is arranged to limit or turn off low priority activity by limiting or preventing one or both of the software update and the streaming data servers 36, 38 from sending communications for the venue to the network access controller 40. The effect of this is to decrease low priority data communications to the venue and therefore increase the bandwidth available for high priority data communications necessary for satisfactory game play at the venue.

Similarly, if the filling degree value associated with a venue is less than a minimum filling degree threshold, the resource control unit 50 communicates with the software update server 36 and/or the streaming data server 38 so as to increase the low priority activity.

The low priority activity may be controlled so as to increase stability in switching of the low priority activity by introducing a delay in turning low priority activity on or off. For example, in FIG. 5 a timing diagram 120 is shown which illustrates a low priority queue filling degree value represented by a queue line 122 and an on/off control signal from the resource control unit 50 to the software update server 36 and the streaming data server 38 represented by a control line 124. Maximum and minimum filling degree thresholds are shown as Thigh and Tlow which represent 80% and 40% respectively of a full low priority queue. Initially, low priority activity for a venue is controlled to be on and communications are therefore allowed between the software update and streaming data servers 36, 38 and the network access controller 40. At time T1, the low priority activity has risen to 80% of the low priority queue which corresponds to threshold Thigh. However, a control signal is not issued from the resource control unit 50 to the software update and streaming data servers 36, 38 until a time T2. If at time T2 the low priority activity is still above Thigh, the resource control unit 50 issues a control signal to the software update and streaming data servers 36, 38 to turn off low priority activity. Residual low priority activity continues at a constant level until communications already in progress finish whereupon low priority activity begins to decrease. At time T3, the low priority activity reaches a minimum threshold T low and if the low priority activity is still below Tlow at a time T4, a control signal is sent from the resource control unit 50 to the software update and streaming data servers 36, 38 to turn on the low priority activity.

While the above example is described in relation to monitoring a low priority queue, it will be understood that as an alternative the filling degree of the high priority queue may be monitored instead of the low priority queue and low priority activity modified based on the high priority queue.

Figures 5, 8:
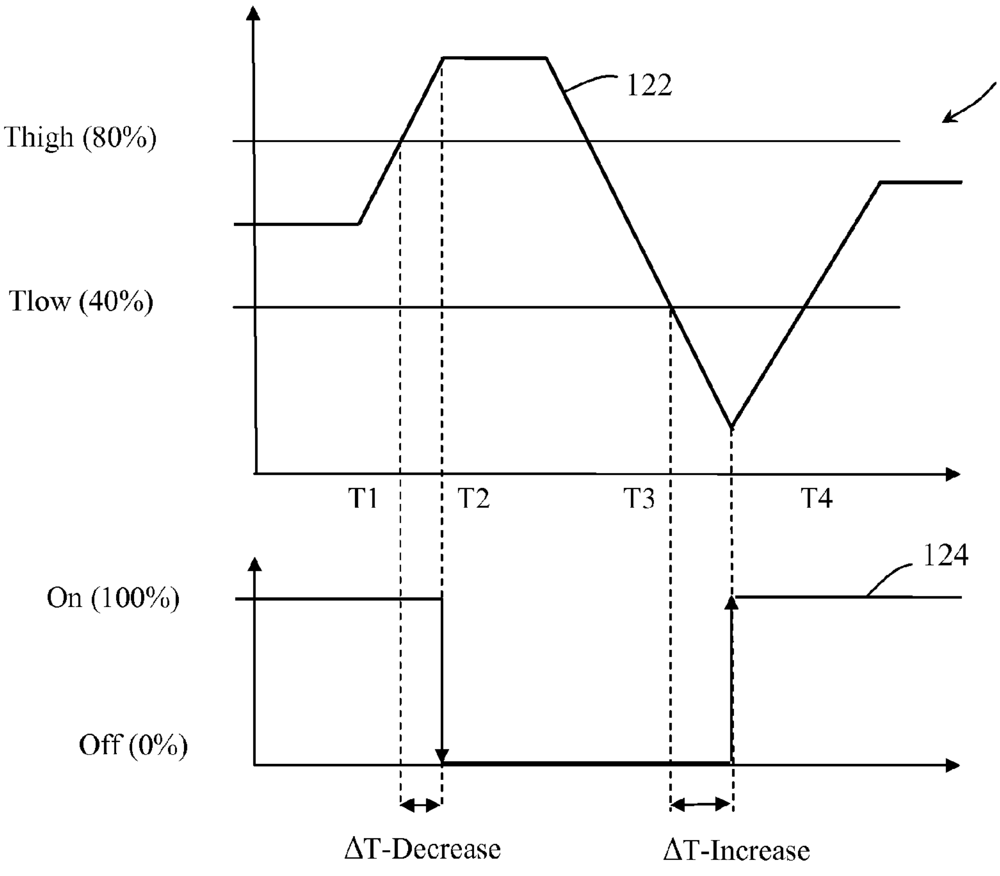
FIG. 5 is a timing diagram used in the embodiment shown in FIG. 1, the timing diagram illustrating filling degree of a low priority queue in response to a control signal.
FIG. 8 is a look up table for use with the gaming system shown in FIG. 6.
Figure 6:
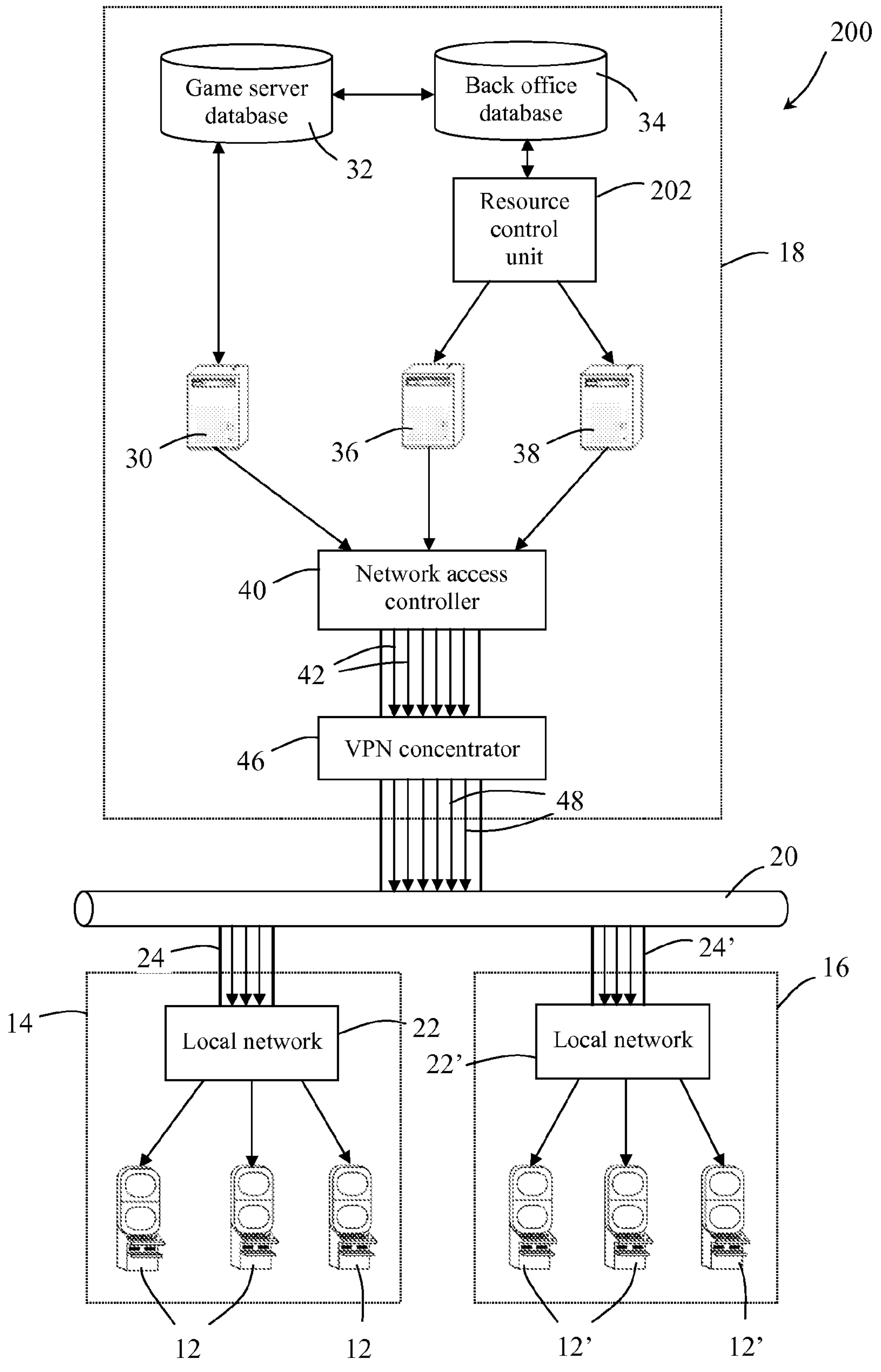
FIG. 6 is a schematic diagram of a gaming system in accordance with an alternative embodiment of the present invention.
Figure 7:
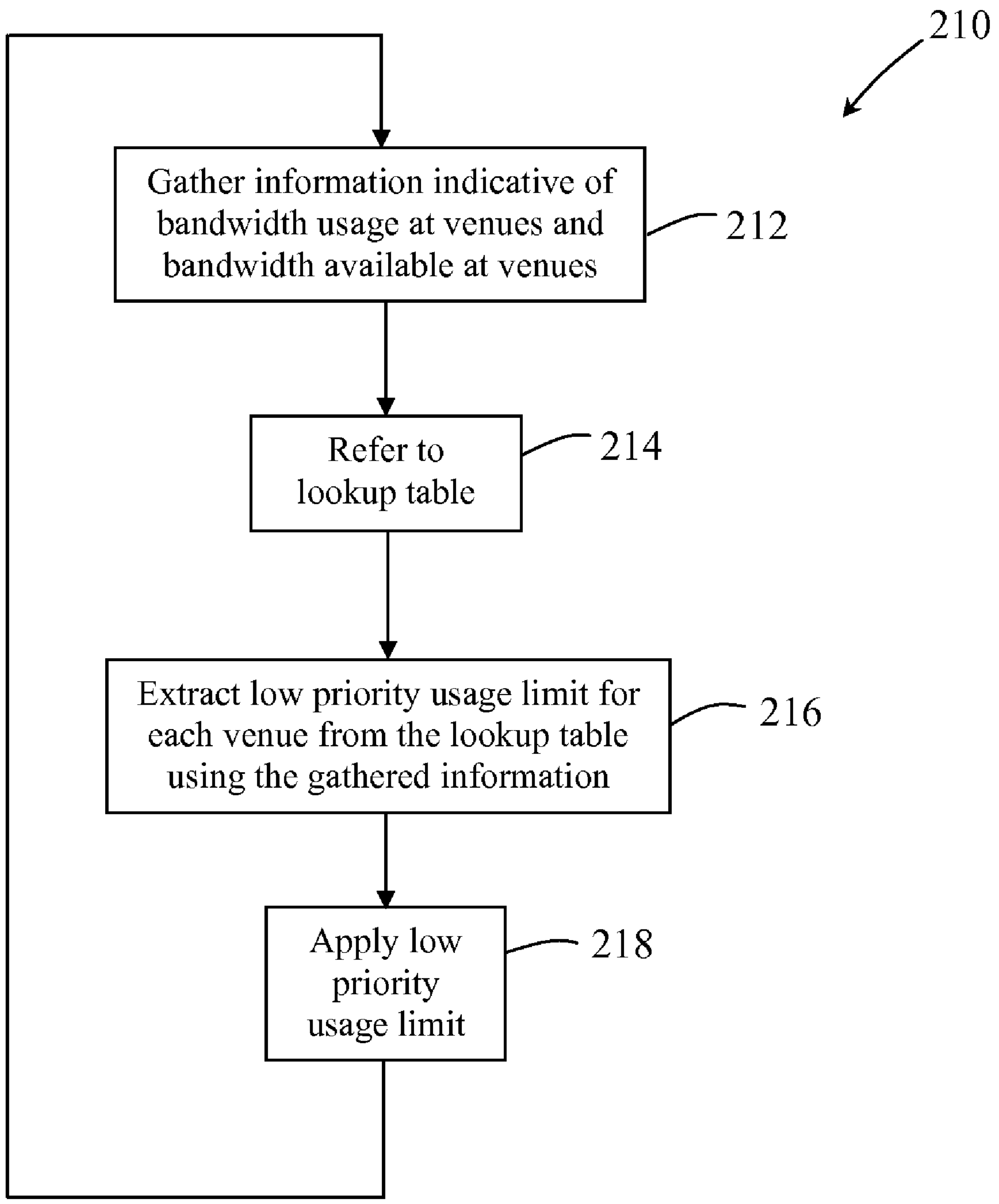
FIG. 7 is a flow diagram illustrating a method of managing bandwidth usage in the gaming system shown in FIG. 6.

An alternative embodiment of a gaming system 200 is shown in FIGS. 6 to 8. Like and similar features are indicated with like reference numerals.

The gaming system 200 is similar to the gaming system 10 shown in FIG. 1. However, with the present embodiment an alternative resource control unit 202 is provided. Instead of gathering information indicative of bandwidth usage in respect of each gaming venue from the network access controller 40, for example using low and high priority queues, information indicative of bandwidth usage in respect of each gaming venue is derived from information stored in the back office database 34.

The back office database 34 includes information as to which gaming machines 12, 12' are currently logged into the gaming system and virtual IP addresses associated with the gaming machines 12, 12'; information as to the gaming machines 12, 12' belonging to each gaming venue; the bandwidth available between the wide area network 20 and each gaming venue 14, 16; and the bandwidth available between the remote base station 18 and the wide area network 20.

It will be understood that the information indicative of the bandwidth available between the wide area network 20 and a venue 14, 16 and the information indicative of the number of gaming machines associated with the venue which are currently logged into the gaming system provides an indirect measure of bandwidth utilisation for gaming activities at the venue.

In the present example, the information derived from the back office database 34 is used with a look up table to obtain values for allowed low priority activities. For example, as shown in FIG. 8, a look up table 230 is provided which is used to obtain a value 238 for allowed low priority activities at a venue based on values for available bandwidth at a venue 232, the number of gaming machines at the venue 234 and the number of gaming machines at the venue which are logged in 236.

As represented by the flow diagram 210 in FIG. 7, during use the resource control unit 50 gathers information indicative of the number of gaming machines at each venue, the number of gaming machines logged in at each venue and the bandwidth available at each venue and derives an allowable low priority activity value for each venue from the look up table 230. The low priority activity value is then used to reduce or increase the low priority activity produced by the software update and streaming data servers 36, 38 in order to maintain high priority activity at a desired level required for satisfactory game play.

In the claims of this application and in the description of the invention, except where the context requires otherwise due to express language or necessary implication, the words "comprise" or variations such as "comprises" or "comprising" are used in an inclusive sense, i.e. to specify the presence of the stated features but not to preclude the presence or addition of further features in various embodiments of the invention.

Modifications and variations as would be apparent to a skilled addressee are deemed to be within the scope of the present invention.

The invention claimed is:

1. A gaming system arranged to implement a plurality of games at a plurality of gaming machines located at a plurality of gaming venues, the gaming system comprising:
- a plurality of gaming machines located at a plurality of gaming venues, each gaming venue having a plurality of associated gaming machines;
- at least one server arranged to serve game play related data and non-game play related data to at least one gaming machine at each of said gaming venues;
- a control device arranged to maintain a queue having queue filling levels, each queue filling level indicative of a level of game play related activity associated with each gaming venue; and
- a resource control unit arranged to obtain information indicative of said queue filling levels and to control the level of non-game play related data served by said at least one server to the at least one gaming machine at a said gaming venue based on said queue filling level.

2. A gaming system as claimed in claim 1, wherein the at least one server comprises a game play related server and a non-game play related server.

3. A gaming system as claimed in claim 1, wherein the gaming system is arranged to maintain a low priority queue having a low priority queue filling level indicative of a level of non-game play related activity associated with each gaming venue, and the resource control unit is arranged to control the level of non-game play related data served to the at least one gaming machine based on the low priority queue filling level.

4. A gaming system as claimed in claim 3, wherein the resource control unit is arranged to decrease the level of non-game play related data served to the at least one gaming machine if the queue exceeds a high activity threshold.

5. A gaming system as claimed in claim 4, wherein the high activity threshold is 80% of a full low priority queue.

6. A gaming system as claimed in claim 4, wherein the level of non-game play related data served to the at least one gaming machine is decreased only if the queue level exceeds a high activity threshold for a predetermined period of time.

7. A gaming system as claimed in claim 3, wherein the resource control unit is arranged to increase the level of non-game play related data served to the at least one gaming machine if the queue filling level is less than a low activity threshold.

8. A gaming system as claimed in claim 7, wherein the low activity threshold is 40% of a full low priority queue.

9. A gaming system as claimed in claim 7, wherein the level of non-game play related data served to the at least one gaming machine is increased only if the queue filling level is less than a low activity threshold for a predetermined period of time.

10. A gaming system as claimed in claim 1, wherein the gaming system is arranged to maintain a high priority queue having a high priority queue filling level indicative of a level of game play related activity associated with each gaming venue, and the resource control unit is arranged to control the level of non-game play related data served to the at least one gaming machine based on the high priority queue filling level.

11. A gaming system as claimed in claim 1, wherein the resource control unit is arranged to obtain data indicative of the number of gaming machines associated with the gaming venue logged into the gaming system.

12. A gaming system arranged to implement a plurality of games at a plurality of gaming machines located at a plurality of gaming venues, the gaming system comprising:

at least one server arranged to serve game play related data and non-game play related data to at least one gaming machine at each of said gaming venues;

a lookup table arranged to store values for allowed levels of non-game play related data associated with each gaming venue and data indicative of the number of gaming machines, associated with the gaming venue logged into the gaming system; and a resource control unit arranged to extract a value for an allowed level of non-game play related data from the lookup table and to modify the allowed level of non-game play related data served to at least one gaming machine at a venue based on the extracted value.

13. A gaming system as claimed in claim 12, wherein the gaming system comprises a back office database arranged to store said lookup table.

14. A gaming system as claimed in claim 1, wherein the gaming system is arranged to establish a virtual communication channel to each gaming machine and to establish a VPN tunnel for each communication channel.

15. A gaming system as claimed in claim 1, wherein the at least one non-game play related server comprises an update server arranged to provide the gaming machines with updated software and a streaming data server arranged to provide the gaming machines with images and/or video.

16. A gaming system as claimed in claim 15, wherein the streaming data server is arranged to provide the gaming machines with images, advertising images and/or video.

17. A method of managing bandwidth usage in a gaming system comprising a remote base station, a plurality of gaming machines located at a plurality of gaming venues and a communications network arranged to facilitate communications between the remote base station and the gaming machines, the method comprising:

serving game play related data to at least one gaming machine during implementation of a game;

serving a non-game play related data to at least one gaming machine;

obtaining data indicative of the available bandwidth between the communications network and each gaming venue and of the number of logged-in gaming machines associated with the gaming venue, said obtaining data including providing a lookup table arranged to store values for allowed levels of non-game play related data for available bandwidth and number of logged-in gaming machines; and controlling the level of non-game play related data served to the at least one gaming machine through the communications network by the at least one non-game play related server based on the obtained data, said controlling including extracting a value for an allowed level of non-game play related data from the lookup table, and modifying the allowed level of non-game play related data for a venue based on the extracted value.

18. A method as claimed in claim 17, comprising maintaining a queue having a queue filling level indicative of a level of non-game play and/or game play related activity associated with each gaming venue, and controlling the level of non-game play related data served to the at least one gaming machine based on the queue filling level.

19. A method as claimed in claim 18, comprising maintaining a low priority queue having a low priority queue filling level indicative of a level of non-game play related activity associated with each gaming venue, and controlling the level of non-game play related data served to the at least one gaming machine based on the low priority queue filling level.

20. A method as claimed in claim 19, comprising decreasing the level of non-game play related data served to the at least one gaming machine if the queue exceeds a high activity threshold.

21. A method as claimed in claim 20, wherein the high activity threshold is 80% of a full low priority queue.

22. A method as claimed in claim 20, comprising decreasing the level of non-game play related data served to the at least one gaming machine only if the queue level exceeds a high activity threshold for a predetermined period of time.

23. A method as claimed in claim 19, comprising increasing the level of non-game play related data served to the at least one gaming machine if the queue filling level is less than a low activity threshold.

24. A method as claimed in claim 23, wherein the low activity threshold is 40% of a full low priority queue.

25. A method as claimed in claim 23, comprising increasing the level of non-game play related data served to the at least one gaming machine if the queue filling level is less than a low activity threshold for a predetermined period of time.

26. A method as claimed in claim 18, comprising maintaining a high priority queue having a high priority queue filling level indicative of a level of game play related activity associated with each gaming venue, and controlling the level of non-game play related data served to the at least one gaming machine based on the high priority queue filling level.

27. A method as claimed in claim 17, comprising providing a back office database arranged to store said lookup table.

28. A method as claimed in claim 17, comprising establishing a virtual communication channel to each gaming machine and establishing a VPN tunnel for each communication channel.

29. A method as claimed in claim 17, wherein the non-game play related data comprises updated software.

30. A method as claimed in claim 17, wherein the non-game play related data comprises advertising images and/or video.

* * * * *